United States Patent Office 3,032,534
Patented May 1, 1962

3,032,534
SULFONE-MODIFIED POLYETHYLENE TEREPHTHALATE
Christian F. Horn, New York, N.Y., assignor to Union Carbide Corporation, a corporation of New York
No Drawing. Filed Oct. 7, 1957, Ser. No. 688,431
15 Claims. (Cl. 260—75)

This invention relates to novel polyethylene terephthalate compositions and to a method for preparing such compositions. The compositions of the invention are unique, as compared with polyethylene terephthalates heretofore proposed, in processing superior dyeability while retaining excellent thermal stability.

U.S. Patent 2,465,319 to Whinfield and Dickson describes several methods for preparing highly polymeric linear polymethylene terephthalates. One of these involves heating a lower alkyl terephthalate such as methyl, ethyl, propyl, butyl, amyl, hexyl and heptyl terephthalates with a polymethylene glycol under conditions producing ester interchange and the formation of a corresponding glycol terephthalate which, upon further heating to a temperature above its melting point, polymerizes into a highly polymeric linear polyester until a stage is reached at which filaments formed from the mass possess cold-drawing properties. The polymerization or polycondensation may, if desired, be carried out in the presence of a catalyst. When ethylene glycol is the glycol used in its preparation, the highly polymeric linear ethylene terephthalate so produced has recurring structural units of the formula (I) 

Polyethylene terephthalates have met with very considerable commercial success. They form tough fibers and sheets having melting points of the order of about 258 to 263° C. and are noted for their insolubility, high crystallinity, tensile strength, pliability, cold-drawing properties and resistance to water. Unfortunately, however, polymeric ethylene terephthalate is extremely difficult to dye. Thus, while polyethylene terephthalate fibers possess many of the most desirable characteristics required for textile applications, their impermeability to water and the consequent difficulty, in some instances impossibility, of dyeing fabrics therefrom by the ordinary dyeing procedures used for cotton, wool, natural silk, regenerated cellulose, nylon, and the like, has undoubtedly kept polyethylene terephthalates from achieving greater commercial acceptance.

It was to be expected that many efforts would be made to improve the dyeability of a film- and filament-forming material having as many desirable characteristics as those possessed by polyethylene terephthalate. Such efforts have indeed been made. Unfortunately, however, the efforts that have resulted in some degree of success in making polyethylene terephthalate more dyeable have done so only at the expense of degrading the polymer substantially with respect to its other characteristics. Thus, for example, a reported effort to improve the dyeability of polyethylene terephthalate by incorporating within its structure minor amounts of certain amino alcohols and thereby giving the polymer a greater ability to absorb acetate dyes and acid dyes, seriously reduces the heat stability of the polyethylene terephthalate so modified. Another effort in this direction involved chemical incorporation of long chain polyalkylene oxides having molecular weights of the order of 1000 to 6000. This modification of the polyethylene terephthalate unfortunately made it quite sensitive to air oxidation and to light. Another proposal involved the utilization of toxic carriers such as the chlorobenzenes, chlorophenols and the like for the dyeing process. Still another involved the application of vat or acetate dyes under superatmospheric pressure at temperatures above 100° C. Another required the use of fiber swelling agents or dye carriers. Still another involved the use of pigments that are mixed directly with the polyethylene terephthalate melt before spinning.

It is apparent that these efforts have had no or very limited success. The methods involving chemical incorporation of modifying agents such as amino alcohols and polyalkylene oxides have involved substantial reduction in thermal stability, the use of toxic carriers is inherently undesirable and dangerous, and special dyeing techniques, such as those requiring dyestuffs that are stable at high temperatures, are too expensive to be commercially practicable.

These difficulties have now been overcome without significantly impairing the characteristics of polyethylene terephthalate. Thus, for example, polyethylene terephthalate fibers and films made in accordance with the method of this invention are readily dyeable by ordinary dyeing techniques while at the same time retaining excellent heat stability, dimensional stability and strength.

In accordance with the invention, polymeric ethylene terephthalate is modified by incorporating within the molecule a minor proportion of structural units having the formula (II) 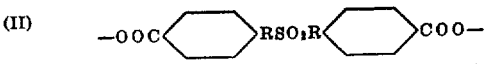

in which the R's are divalent alkylene radicals containing from one to five carbon atoms. This is preferably accomplished by carrying out the reaction of a lower alkyl terephthalate and ethylene glycol with a minor amount of dialkylene monosulfone diester.

In a preferred embodiment of the method of the invention, a dialkyl terephthalate is mixed with ethylene glycol and a minor proportion of monosulfone. The mixture is heated and reacted under conditions producing ester interchange as described in Patent 2,465,319 and then further heated for polycondensation or copolymerization of the monomers until a highly polymeric, linear ethylene terephthalate modified by occasionally recurring monosulfone units is formed.

The alkyl terephthalate monomer initially employed may be any of the lower alkyl esters of terephthalic acid which, upon undergoing ester interchange with ethylene glycol, forms an alcohol that has a boiling point below about 200° C. Dimethyl terephthalate is preferred because of its ready availability and the low boiling point of methyl alcohol produced as a by-product during the ester interchange reaction.

The monosulfones that are suitable for use in modifying polyethylene terephthalate in accordance with the invention are those having the general formula (III) 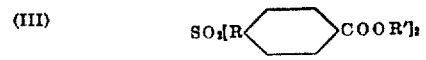

in which the R's are divalent alkylene radicals containing from one to five carbon atoms and the R"s are alkyl radicals which also form alcohols having boiling points below about 200° C. when the sulfone undergoes ester interchange with ethylene glycol. The R's are preferably polymethylene radicals and the R"s are preferably lower alkyl radicals. Optimum results have been obtained with sulfones in which the R's are polymethylene radicals and the R"s are methyl.

The diaralkylene monosulfones can be prepared in several ways. One method of preparation that has been found suitable involves reacting a chloride

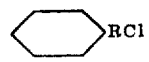

in which the R is as defined with reference to Formula I, with acetyl chloride in the presence of aluminum chloride as a catalyst and carbon disulfide as the reaction medium to form the corresponding acetophenone, oxidizing the acetophenone with an alkaline hypobromite solution and then acidifying with hydrochloric acid to form the corresponding para-benzoic acid, reacting the latter with sodium sulfide to form the corresponding 4,4'-(thiodialkylene)dibenzoic acid and then oxidizing with peracetic acid or other suitable oxidizing agent to convert the thio acid into the corresponding sulfonyl dibenzoic acid. If a diester is desired, the sulfonyl dibenzoic acid can be esterified with the appropriate alcohol. The entire sequence of reaction is illustrated as follows:

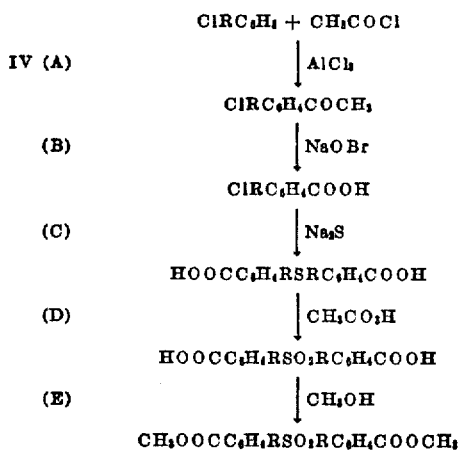

The R's, as indicated previously, stand for saturated divalent alkylene radicals containing up to five carbon atoms.

It will readily be apparent from a consideration of the ultimate structure of the modified polyethylene terephthalates of the invention in which terephthalate and ethylene glycol residues are conjugated to form long chains, a terephthalate residue being occasionally replaced by a sulfone residue, that ethylene glycol must be used in a molar amount that is at least equal to the combined molar amounts of terephthalate and sulfone. For practical considerations, the minimum molar amount of ethylene glycol should be at least about twice the combined molar amount of terephthalate and sulfone. The preferred ratio is within the range of about three to ten times this amount. A greater excess of ethylene glycol does not by any means make the method inoperable but is not preferred because it serves no useful purpose and simply increases the amount of ethylene glycol that must be recovered in the polycondensation reaction.

The proportion of sulfone in the reaction mix is minor compared to the proportions of terephthalate and ethylene glycol. It should be at least sufficient significantly to improve the dyeability of the ultimate polymer yet not so great as to reduce its melting point too much. While effects may vary somewhat depending upon the particular sulfone that is used, it is generally desirable to limit the proportion of sulfone in the polymer to between about 3 and about 17 mol percent based on the amount of total esters. It is to be understood of course that if less dyeability is required it is permissible to depart from this range by utilizing less than about 3 mol percent and that if melting points below about 230° C. are not considered a disadvantage, the sulfone content may be increased above the maximum specified.

The ester interchange can be effected at temperatures within the range of about 100 to 200° C., preferably about 160 to 185° C., and may be accelerated by the use of any one or combination of the well known ester interchange catalysts such as calcium, sodium, dibutyltin oxide, tributyltin hydroxide, dilauryltin oxide, lead borate, lead salicylate, lead benzoate, lead carbonate, lead acetate, dibutyltin dichloride, or the like. It is advantageous to perform the ester interchange under conditions that minimize oxidation and assist in removing alcohol that is first formed as a by-product and then removing excess glycol, e.g., by working at atmospheric or superatmospheric pressure while forcing or bubbling an inert gas such as nitrogen through the melt or by carrying out the ester interchange under subatmospheric pressure.

When the ester interchange is complete, as will be evident by a reduction in the rate of formation of alcohol, the reaction mix is subjected to polycondensation by further heating at a somewhat higher temperature within the range of about 200 to 300° C., preferably about 270 to 280° C. This polycondensation step can also be performed by the vacuum technique or by forcing an inert gas such as nitrogen through the melt and further by using one or more polycondensation catalysts. It is continued until filaments formed from the mass possess the property of cold-drawing.

A primary advantage of the invention is that shaped structures such as filaments, films, and the like, of polymeric ethylene terephthalate are dyeable to deep shades by conventional dyeing techniques and dyestuffs. Another important advantage is that dye dispersing agents and swelling agents are unnecessary for dyeing fibers made from polyethylene terephthalate modified in accordance with the invention. Still another advantage is that the ready dyeability of the modified polyethylene terephthalate is obtainable without significant sacrifice of such other important characteristics as heat stability, strength and cold-drawing ability.

These and other advantages, as well as the utility of the method and products of the invention, will become further apparent from the following detailed examples included to illustrate the best modes now contemplated of carrying out the invention. In these examples, the parts are by weight and reduced viscosity, used as a measure of the degree of polymerization, is defined as:

$$(V) \qquad I_R = \frac{\left(\frac{\Delta N}{N_0}\right)}{C}$$

in which $\Delta N$ is the difference between flow time of solution and flow time of solvent, $N_0$ stands for flow time of solvent and $C$ is the concentration of the polymer in grams per 100 cc. of solution. Reduced viscosity values were obtained with a 3:2 mixture of phenol and tetrachloroethane as the solvent and with a polymer concentration of 0.2 gram/100 cc. in the solution.

*Example 1*

Dimethyl terephthalate (200 parts), dimethyl-4,4'-[sulfonyl - bis - (trimethylene)]dibenzoate (22.6 parts-5 mol percent total esters), and ethylene glycol (200 parts) were charged to a condensation vessel with calcium (0.18 part) and sodium (0.19 part) dissolved in ethylene glycol. After an initial ester exchange at 185° C. in a nitrogen atmosphere while passing a vigorous stream of nitrogen through the melt, the mixture was heated to 280° C. for five hours for polycondensation.

A white, excellent fiber-forming resin was obtained. It melted at 252 to 253° C. and had a reduced viscosity of 0.65 at 47° C. The polymer was melt-spun into strong fibers which showed improved dye absorption for "Sulfanthrene Red 3B Base," a thioindigo dye, compared with unmodified polyethylene terephthalate.

*Example 2*

Dimethyl terephthalate (30 parts), dimethyl 4,4'-sulfonylditoluate (4.86 parts-8 mol percent total esters), ethylene glycol (35 parts) and magnesium acetate (0.0418 part) were placed into a condensation vessel equipped at the bottom for introduction of finely dispersed nitrogen. The initial ester exchange was carried out between 185 and 190° C. over a period of two hours with continuous removal of methanol by a stream of introduced nitrogen (0.1 liter/min.). After the theoretical amount of methanol was collected in the receiver, the temperature was raised to 230 to 240° C. to distill over the excess of glycol over a period of 0.7 hour while passing 2 liter/min. of nitrogen through the melt. The final polymerization was conducted at 270 to 275° C. for seven hours, a small stream of nitrogen (2.8 to 5.1 liter/min.) again being used.

The polyester obtained showed excellent fiber-forming and cold-drawing properties. Its reduced viscosity was 0.52 at 30° C. and its melting point 242 to 243° C.

It is to be expected that numerous modifications will readily become apparent to those skilled in the art upon reading this description. All such modifications are intended to be included within the scope of the invention as defined in the appended claims.

I claim:

1. A fiber-forming polymeric linear ethylene terephthalate consisting of recurring structural units of the formulae

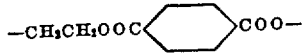

and

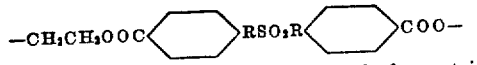

wherein the R's are divalent alkylene radicals containing from one to five carbon atoms, the proportion of sulfone in the polymer being between about 3 and about 17 mol percent based on the total amount of esters.

2. A fiber-forming polymeric linear ethylene terephthalate consisting of recurring structural units of the formulae

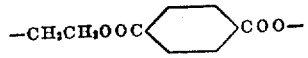

and

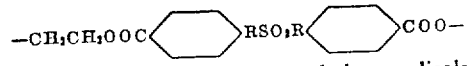

wherein the R's are divalent polymethylene radicals containing from one to five carbon atoms, the proportion of sulfone in the polymer being between about 3 and about 17 mol percent based on the total amount of esters.

3. A fiber-forming polymeric linear ethylene terephthalate consisting of recurring structural units of the formulae

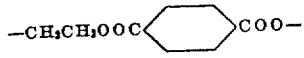

and

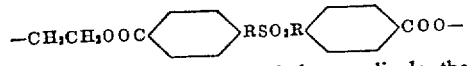

wherein the R's are divalent methylene radicals, the proportion of sulfone in the polymer being between about 3 and about 17 mol percent based on the total amount of esters.

4. A fiber-forming polymeric linear ethylene terephthalate consisting of recurring structural units of the formulae

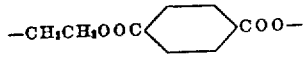

and

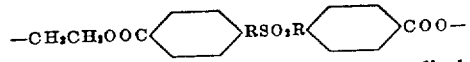

wherein the R's are divalent trimethylene radicals, the proportion of sulfone in the polymer being between about 3 and about 17 mol percent based on the total amount of esters.

5. A polyethylene terephthalate fiber having, as part of the chain and as the sole chain modifying agent therefor, a minor proportion of diaralkylene monosulfone units having the formula

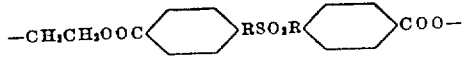

wherein the R's are divalent alkylene radicals containing from one to five carbon atoms, the proportion of sulfone in the polymer being between about 3 and about 17 mol percent based on the total amount of esters.

6. A polyethylene terephthalate fiber having, as part of the chain and as the sole chain modifying agent therefor, a minor proportion of diaralkylene monosulfone units having the formula

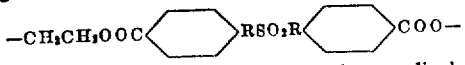

wherein the R's are divalent polymethylene radicals containing from one to five carbon atoms, the proportion of sulfone in the polymer being between about 3 and about 17 mol percent based on the total amount of esters.

7. A polyethylene terephthalate fiber having, as part of the chain and as the sole chain modifying agent therefor, a minor proportion of diaralkylene monosulfone units having the formula

wherein the R's are divalent methylene radicals, the proportion of the sulfone in the polymer being between about 3 and about 17 mol per percent based on the total amount of esters.

8. A polyethylene terephthalate fiber having, as part of the chain and as the sole chain modifying agent therefor, a minor proportion of diaralkylene monosulfone units having the formula

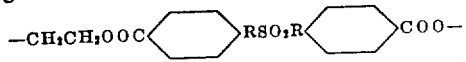

wherein the R's are divalent trimethylene radicals, the proportion of sulfone in the polymer being between about 3 and about 17 mol percent based on the total amount of esters.

9. A dye-receptive fiber of a polyester of reactants consisting essentially of dimethyl terephthalate, ethylene glycol and a sulfonyl diester having the formula

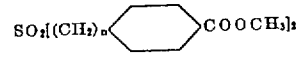

wherein the $n$'s are integers from 1 to 5, the proportion of sulfone in the polymer being between about 3 and about 17 mol percent based on the total amount of esters.

10. Method of preparing a polyester which comprises heating a mixture consisting essentially of dialkyl terephthalate in which the alkyl groups are radicals of alcohols having boiling points below about 200° C., ethylene glycol and between about 3 and about 17 mol percent, based on the total amount of esters, of a sulfone of the general formula

wherein the R's are divalent alkylene radicals containing from one to five carbon atoms to a temperature within the range of about 100 to 200° C. until elimination of alcohol therefrom is substantially complete and thereupon heating the reactants to a temperature of the order of about 200 to 300° C. to obtain a fiber-forming melt.

11. Method as defined in claim 10 wherein the initial ester interchange and subsequent polycondensations are carried out in the presence of a catalyst.

12. Method as defined in claim 10 wherein the initial ester interchange and subsequent polycondensations are carried out under a nitrogen atmosphere.

13. A process for preparing modified polyethylene terephthalate polymer containing dye-receptive sulfonyl groups which comprises heating, to a temperature within the range of about 100 to 200° C., a mixture consisting essentially of dialkyl terephthalate in which the alkyl groups are radicals of alcohols having boiling points below about 200° C., ethylene glycol and between about 3 and about 17 mol percent, based on the total amount of esters, of a diaralkylene monosulfonyl diester having the formula

wherein the R's are divalent alkylene radicals containing from one to five carbon atoms and the R"'s are lower alkyl radicals of alcohols having boiling points below about 200° C. until elimination of alcohol therefrom is substantially complete, and continuing the heating to obtain a fiber-forming melt.

14. A process for preparing modified polyethylene terephthalate polymer containing dye-receptive sulfonyl groups which comprises heating, to a temperature within the range of about 100 to 200° C., a mixture consisting essentially of dimethyl terephthalate, between about 3 and about 17 mol percent, based on the total amount of esters, of a diaralkylene monsulfone diester having the formula

wherein the R's are divalent alkylene groups containing from one to five carbon atoms and the R"'s are lower alkyl radicals of alcohols having boiling points below about 200° C., and from one to ten mols ethylene glycol per combined mol of dimethyl terephthalate and sulfone until elimination of alcohol therefrom is substantially complete, and continuing the heating to obtain a fiber-forming melt.

15. A process for preparing modified polyethylene terephalate polymer containing dye-receptive sulfonyl groups which comprises heating, to a temperature within the range of about 100 to 200° C., a mixture consisting essentially of dimethyl terephthalate, between about 3 and about 17 mol percent, based on the total amount of esters, of a diaralkylene monosulfone diester having the formula

wherein the $n$'s are integers from 1 to 5, as part of the chain and as the sole chain modifying agent therefor, until elimination of alcohol therefrom is substantially complete, and continuing the heating to obtain a fiber-forming melt.

References Cited in the file of this patent
UNITED STATES PATENTS

| | | |
|---|---|---|
| 2,427,640 | Whitehill et al. | Sept. 16, 1947 |
| 2,689,864 | Emerson et al. | Sept. 21, 1954 |
| 2,720,502 | Caldwell | Oct. 11, 1955 |
| 2,744,094 | Caldwell | May 1, 1956 |

UNITED STATES PATENT OFFICE
CERTIFICATE OF CORRECTION

Patent No. 3,032,534

May 1, 1962

Christian F. Horn

It is hereby certified that error appears in the above numbered patent requiring correction and that the said Letters Patent should read as corrected below.

Column 1, line 13, for "processing" read -- possessing --; column 6, line 24, strike out "the", first occurrence; column 8, lines 15 and 16, strike out "as part of the chain and as the sole chain modifying agent therefor" and insert instead -- and from 1 to 10 moles ethylene glycol per combined mole of dimethyl terephthalate and sulfone --.

Signed and sealed this 13th day of November 1962.

(SEAL)
Attest:

ERNEST W. SWIDER
Attesting Officer

DAVID L. LADD
Commissioner of Patents